(12) United States Patent
Mogens

(10) Patent No.: US 6,691,862 B1
(45) Date of Patent: Feb. 17, 2004

(54) DRAINED CONVEYOR CHAIN LINK

(75) Inventor: Rud Mogens, Esbjerg (DK)

(73) Assignee: Gram Equipment A/S, Vojens (DK)

( * ) Notice: Subject to any disclaimer, the term of this patent is extended or adjusted under 35 U.S.C. 154(b) by 0 days.

(21) Appl. No.: 10/130,988

(22) PCT Filed: Nov. 24, 2000

(86) PCT No.: PCT/DK00/00648
§ 371 (c)(1),
(2), (4) Date: Jun. 7, 2002

(87) PCT Pub. No.: WO01/38206
PCT Pub. Date: May 31, 2001

(30) Foreign Application Priority Data

Nov. 23, 1999 (DK) ........................ 1999 01694

(51) Int. Cl.$^7$ .............................. B65G 17/06
(52) U.S. Cl. .................... 198/851; 198/779; 474/93; 474/92
(58) Field of Search ............... 198/779, 851; 474/93, 92

(56) References Cited

U.S. PATENT DOCUMENTS

| | | | |
|---|---|---|---|
| 3,646,752 A | 3/1972 | Kampfer | |
| 3,844,221 A | 10/1974 | Fromme | |
| 4,262,978 A | * 4/1981 | Everett | ...... 308/36.1 |
| 4,264,001 A | * 4/1981 | Jensen et al. | ...... 198/344 |
| 4,297,839 A | 11/1981 | Gurney | |
| 4,353,459 A | 10/1982 | Petershack | |
| 4,571,228 A | 2/1986 | Tracy | |
| 4,704,099 A | 11/1987 | Rohloff | |
| 4,782,940 A | 11/1988 | Hogg | |
| 4,932,927 A | 6/1990 | Fillar | |
| 5,140,806 A | 8/1992 | Rohloff | |
| 5,288,278 A | 2/1994 | Nagano | |
| 5,305,872 A | 4/1994 | Hutton | |
| 5,425,679 A | 6/1995 | Utz | |
| 5,437,148 A | 8/1995 | Karp | |

FOREIGN PATENT DOCUMENTS

| | | | | |
|---|---|---|---|---|
| DE | 2042642 | | 8/1972 | |
| DE | 3629410 | * | 3/1988 | ...... F16H/57/05 |
| DE | 172620 | | 3/1991 | |
| DE | 4426506 | | 2/1996 | |
| DE | 19639362 | | 3/1998 | |
| DE | 19808166 | * | 9/1998 | ...... F16G/13/00 |
| DE | 19820039 | | 12/1998 | |
| DK | 47217 | | 4/1933 | |
| EP | 0257661 A2 | * | 8/1987 | ...... F16G/13/06 |
| EP | 0257661 | | 3/1988 | |
| FR | 905462 | | 12/1945 | |
| FR | 2726062 | * | 4/1996 | ...... F16G/15/12 |
| GB | 2013302 | | 8/1979 | |
| GB | 2309062 | | 7/1997 | |
| GB | 2309062 A | * | 7/1997 | ...... B65G/17/08 |
| GB | 2320234 | | 6/1998 | |
| SE | 1097533 | | 6/1982 | |

* cited by examiner

Primary Examiner—Christopher P. Ellis
Assistant Examiner—Rashmi Sharma
(74) Attorney, Agent, or Firm—James Creighton Wray; Meera P. Narasimhan

(57) ABSTRACT

A chain link with bushing in a drive chain where the bushing comprises at least one drain bole for draining liquid inappropriately collected in the bushing. In a further development of the invention, especially in connection with conveyor chains, the bushing comprises a bushing insert with contact surface for the chain pin, where the bushing insert is provided with drain holes. The invention is preferably used in connection with conveyor chains, in particular by the production of foodstuffs by freezing temperature.

10 Claims, 7 Drawing Sheets

DRAINED CONVEYOR CHAIN LINK

This application claims the benefit of Danish Application No. PA 1999 01694 filed Nov. 26, 1999 and PCT/DK00/00648 filed Nov. 24, 2000.

BACKGROUND OF THE INVENTION

The present invention concerns a chain link with bushing in a drive chain. The invention also concerns the use of such a chain link.

In connection with conveyor chains by the manufacturing of goods, chain systems are used for conveying holders/containers/trays on/in which the goods are placed during the different production steps.

These chains may be designed in different ways, for sprocket wheels as well as for toothed chains. One of the embodiments, which is widely used, is a roller chain where the chain has great resemblance to chains used for bicycles, motorcycles, etc. In the roller chain the chain pins are fastened, usually riveted, to the outer fishplates while the bushing through which the chain pin is disposed is connected with the inner fishplates. In order to prevent unnecessary wear on the bushing, there is mounted a roller around the bushing.

Other possibilities are the bushing chain, the Gall chain, the Fleyer chain, or toothed chains of different kinds. All link plates are mainly parallel in these chains. A further possibility is the Rotary chain where the link plates are not parallel.

Especially for conveyor chains it is a fact that they have to be laterally flexible to a certain degree so that the chain may run between sprocket wheels disposed in different planes of rotation. This would be difficult if the chains were rigid in the direction of driving. For the chains to be flexible, the bushings are often provided with an inner bushing hole having a cross-section which is made larger than the used chain pins provided through the bushings.

An example is described in U.S. Pat. No. 4,297,839. The chain described in this patent has the primary function of linking a row of wheels used for conveying conveyor units. The principle is not immediately applicable for common conveyor chains running around sprocket wheels.

In order that water does not collect in the interspace between the chain pins and the walls of the bushing holes, a lubricant is often used in the bushings. If a chain for conveyor belts is used for foodstuff production, it is, however, inappropriate that the chain is lubricated with a lubricant as this lubricant, by mixing with dust and the like, under unfavourable circumstances may fall off the chain and contaminate the foodstuff during the process. By foodstuff production, on the other side, if the chain is not lubricated, water may be collected in the assembly bushings of the chain. By the making of freezer goods, like icecream products, where the conveyor runs through a freezer tunnel, the consequence is, in that case, that the chain becomes stiff or that the chain breaks which is a well-known problem and a great drawback.

SUMMARY OF THE INVENTION

The object of the invention is to indicate a chain link with bushing for drive chains, preferably conveyor chains, where no water is collected in the bushing of the chain links even if no water repelling lubricants are used.

This purpose is used with a chain link with bushing in a drive chain which is characterised as described in the characterising part of claim 1.

In the chain links for the drive chain, the bushings according to the invention are provided with drain holes wherethrough possible collected water may run out of the bushing. These drain holes may be provided at different places in the bushing, depending of the form of chain and the orientation of conveying of the chain, for example the holes may be provided in the centre or along the rim of the bushing, at the upper side or the lower side of the chain link, or in direction parallel with the direction of advancing the chain. In principle there is no limit to the position and the number of holes in the bushing.

Conveyor chains are often used with the links oriented so that the chain pins are mainly vertical. In such a case it is advantageous to have the holes provided in the lower part of the bushing. In order that the chain may be turned also, the bushings may advantageously be provided with drain holes both in the upper and the lower part of the bushing.

It has appeared that chain links according to the invention with bushing provided with drain hole are particularly applicable to conveyor chains. Since conveyor chains are to be laterally flexible, the hole of the bushing in which the chain pin is disposed is usually made somewhat larger than the chain pin itself. The increased volume between the chain pin and the inner wall of the bushing causes a reduction of the capillary forces so that water more easily runs out of this volume.

In case that the bushing hole of the bushing is circular and has a much greater radius that the chain pin, which is common to known conveyor chains, the contact surface between the chain pin the bushing hole is very small, especially if the contact surface does not extend along the whole bushing hole but only along a part—the contact part—of the hole. This is unfavourable as hereby large surface pressures occurs. In a further development of the invention there is made allowance for this as the contact part, at its front part, is formed with a bending radius corresponding to the radius of the chain pin. In this way the contact surface is relatively great by advancing the chain straightly as the chain pin bears against the face of the contact surface with a relative large part of the surface.

The part of the bushing hole extending through the contact part will be designated contact hole in the following. It is noted that the contact hole may be shorter than the bushing hole itself.

According to a further development of the invention, this contact hole has a cross-section being elongate, for example oval, whereby the chain is laterally flexible.

By forming the elongate contact hole with a width increasing with the distance from the front edge of the hole, a further advantageous function is achieved. In case that all the water is not running out of the bushing, for example if a little water is retained around the chain pin due to capillary forces, by ice formation on the contact surface between the chain pin and the bushing there will be enough space for the chain pin in case of its backwards sliding, whereby breakage of the chain is avoided. The shape of the hole thus performs a number of different functions in combination.

In a further development of the invention, in cases where the drive chain is a roller chain or a bushing chain, there is designed a bushing consisting partly of a tubular bushing part with an inner duct and partly of one or two bushing inserts which are disposed in this duct. The tubular bushing part may be designed as a traditional cylindric bushing known from common roller chains like bicycle chains. The bushing inserts disposed in the inner duct of the bushing are provided with a through-going hole through which the chain pin is provided. The inserts comprise the contact part, i.e. the chain pin is in contact with the bushing inserts and not directly with the inner duct of the bushing when advancing the drive chain. The previously mentioned bushing hole is thereby constituted by the hole through the insert and the remaining part of the inner duct which is not covered by the insert. There are several advantages connected with the bushing inserts.

A first advantage is that the tubular bushing part of the invention may be constituted by the cylindric bushing of steel known from traditional roller chains. The insert then comprises the contact part the hole of which—the contact hole—for the chain pin may be shaped elongate in cross-section so that the contact hole has the advantageous properties described hereinabove. In this way, the making of the chain with chain links according to the invention is relatively simple as only few modifications of existing production steps are required for roller or bushing chains.

The tubular bushing part of the bushing may be cylindric or with other cross-section, for example quadratic. A quadratic cross-section has the advantage that the insert in the bushing will be prevented from rotating in the bushing, thus ensuring that the contact hole of the insert maintains its orientation, also under load and by long-time operation.

Another advantage is that the inserts may be made of a material, for example a polymer having small sliding resistance. Furthermore, the inserts may be made of a material being water lubricating. In this way, wear due to lack of lubrication from conventional lubricants is reduced.

A third advantage is that exactly the inserts constitute the primary wear parts on the chain. When the inserts are worn out, the chain can be disassembled by pressing the chain pins out of the chain links, and new inserts may be provided, whereby the chain may be re-used after assembly. The inserts thus have a cost-saving function with environment-friendly aspects.

A fourth advantage is that the inserts are a relatively small part of the chain which easily may be modified if another shape of the contact hole with the contact surface for the chain pin is desired.

In a further development, by roller chains and bushing chains having inner and outer fishplates, the chain link according to the invention is provided with inserts having a collar extending from the inner duct to and around the edge of the inner fishplate and extending in the interspace between the outer fishplate and the inner fishplate. This collar prevents that the insert rotates in the inner duct in the tubular bushing if this duct is cylindrical. Furthermore, the collar reduces the friction between the inner and the outer fishplates if the collar is made of a friction reducing and/or water lubricating material.

For the chains used with an orientation so that the chain pins are vertical, a drain hole in the bushing is advantageously provided in the insert. The collar ensures the existence of a certain distance between the inner and the outer fishplates where the water may run out of the bushing through a hole in the insert.

In an alternative, further development of the invention, the chain pin is enclosed by a closely fitting insert. In this case the bushing hole, which below is designated the contact hole, is constituted by the hole through the bushing part. This contact hole may thus have an elongate cross-section, e.g. oval, whereas the insert enclosing the chain pin has an outer circular cross-section. The front part of the contact hole is designed with an contour, e.g. bending radius, corresponding to the front contour of the insert whereby is ensured a large surface of contact between the insert and the contact hole when running. The elongate cross-section provides for a reduction of capillary forces in the hole and lateral flexibility of the chain.

In a preferred embodiment of the invention, the bushing hole is circular whereas the insert enclosing the chain pin, advantageously of polymer, is elongate. The front contact surface of the insert has bending radius corresponding to bending radius of the front part of the contact hole in order to ensure a large surface of contact. In the longitudinal direction of the chain, however, the cross-section of the insert is shorter than the bushing hole whereby is achieved the same advantages as described above.

In the following, the chain link according to the invention is illustrated as chain link for a roller chain even though the invention may also be used in other types of chains, cf. the above description.

BRIEF DESCRIPTION OF THE DRAWINGS

The invention is now described more closely with reference to the drawing, where.

DETAILED DESCRIPTION OF THE PREFERRED EMBODIMENTS

FIG. 1 shows different types of chains where bushings typically are or may be used. FIG. 1a shows a roller chain with rolls around the bushing; FIG. 1b shows a bushing chain similar to the roller chain but without the rolls around the bushing; FIG. 1c shows a toothed chain where toothed chains, however, can assume many different forms; FIG. 1d shows a so-called Gall chain; FIG. 1e shows a so-called Fleyer chain; and FIG. 1f a Rotary chain.

Figure 1A:
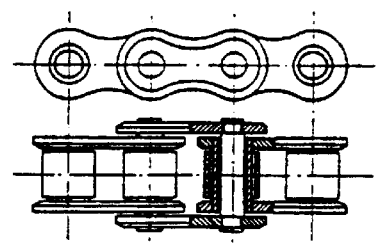
FIG. 1 shows different types of chains.
Figure 1B:
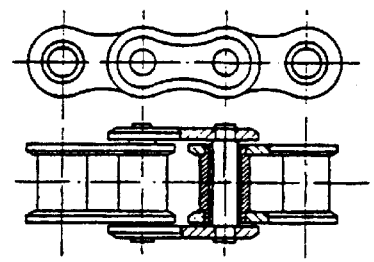
Figure 1C:
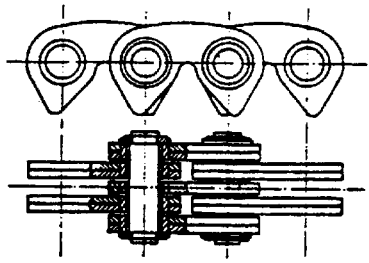
Figure 1D:
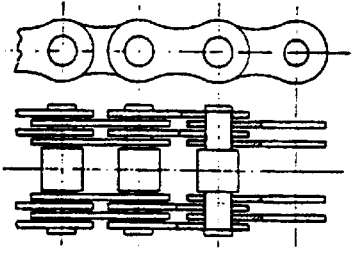
Figure 1E:
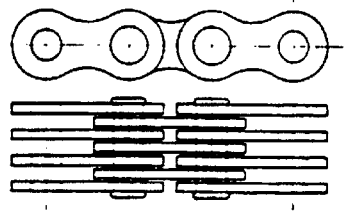
Figure 1F:
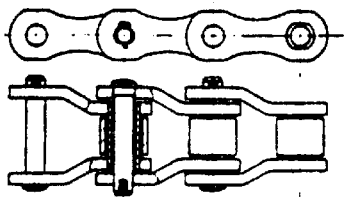
Figure 2A:
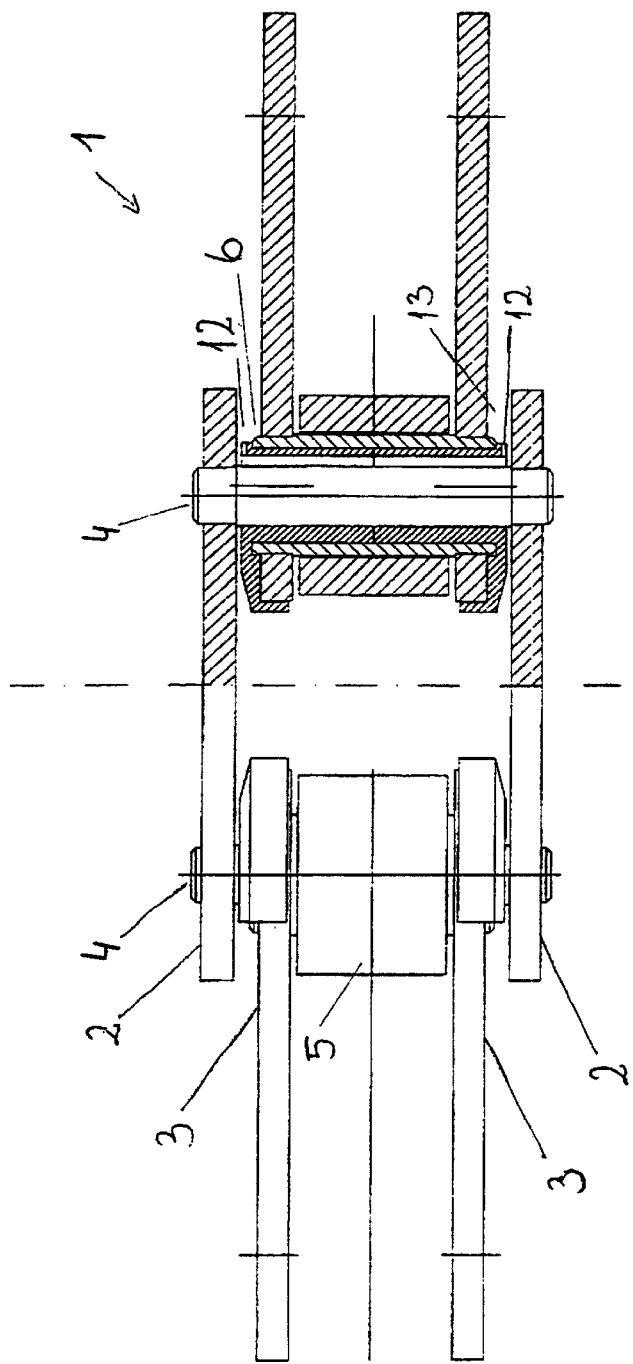
FIG. 2 shows a chain link according to the invention.
Figure 2B:
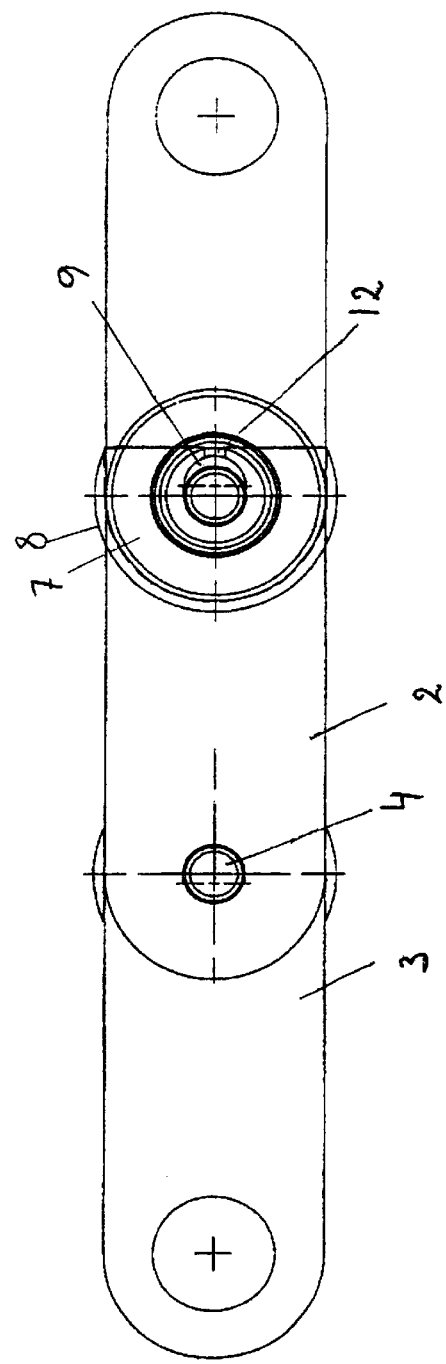

FIG. 2 shows a chain link according to the invention in the shape of a link 1 for a roller chain. The chain is shown in FIG. 2a as seen from the side and in FIG. 2b as seen from below. It is noted that the chain shown is intended for use in a chain conveyor and in such a way that the chain pins are oriented vertically. The chain has a number of similarities with a traditional roller chain and comprises outer fishplates 2 and inner fishplates 3, where the two outer fishplates 2 are rotatably connected with the inner fishplates 3 via a chain pin 4 which is fastened to the outer fishplates 3. A roller 5 around the bushing reduces wear on the bushing during operation. The fishplates 2 and the rollers 5 in the chain link according to the invention can be made from different materials. For application in the food industry, the materials are advantageously stainless steel and/or polymer materials.

Figure 3:
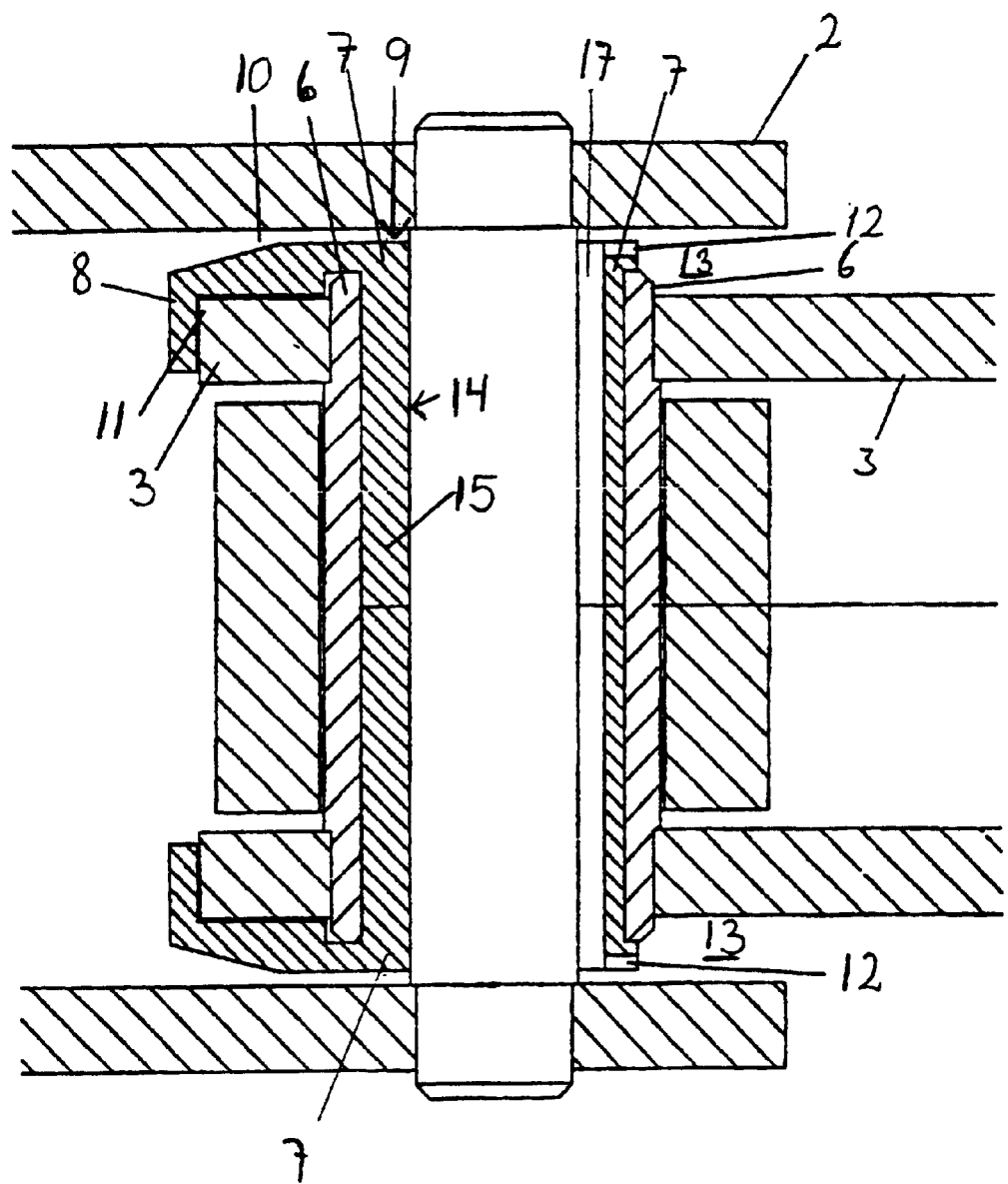
FIG. 3 shows a part of the chain link enlarged.

FIG. 3 shows a part of the picture of the chain link of FIG. 2 in an enlarged version. The chain link differs from known art by the form of the bushing which comprises a tubular bushing part 6 and a two-piece insert 7. The insert may also be designed as a single insert or as two parts that do not extend completely to the middle of the bushing part 6. The insert comprises a-collar 8 extending from the inner duct 9 to and around the edge 11 of the inner fishplates 3 and extending in the interspace 10 between the outer fishplates 2 and the inner fishplates 3. The insert 7 is provided with drain holes 12 (see also FIG. 2b) which are disposed in an interspace 13 between the inner fishplates 3 and the outer fishplates 2.

The inner duct 9 is constituted by an interspace formed between the inner side of the tubular bushing part 6 of the bushing and the chain pin 4. In the embodiment shown, the insert 7 passes through and fills up the whole inner duct 9 of the tubular bushing part 6. A contact hole 17 with contact surface 14 thus extends through the whole inner duct 9 whereby a contact part 15 extends through the whole insert 7. The contact part 15 is a part of the insert 7 being in contact with the contact surface 14. The insert 7 may, however, be limited to only extending partly into the tubular bushing part 6, whereby the contact part 15 and the contact surface 14 become lesser.

The tubular bushing part 6 is preferably cylindric but other shapes may be used with advantage, e.g. angular, such as quadratic. By a tubular bushing part 6 with a quadratic inner duct, a bushing insert with suitable outer quadratic cross-section cannot rotate. also without a collar, whereby the orientation of the contact hole will be maintained also under load during operation.

Figure 4A:
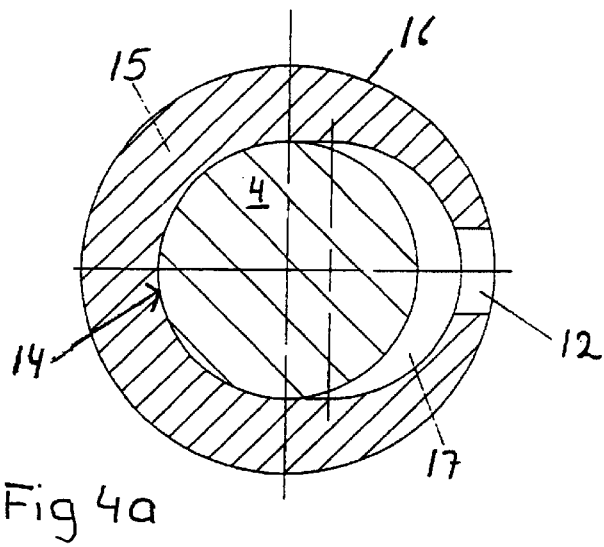
FIG. 4 shows examples of the shape of a contact hole.
Figure 4B:
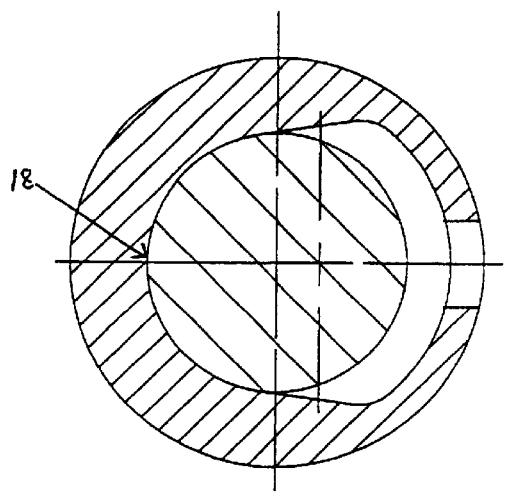
Figure 4C:
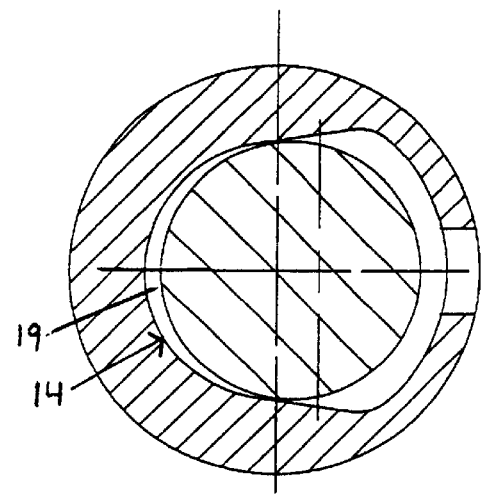

FIG. 4 shows the cross-section of the contact part 15 of the insert which the chain pin 4 is in contact with. The outer contour 16 of the contact part 15 largely illustrates the inner duct 9 of the bushing. The contact hole 17 in the insert 7, where the contact hole 17 constitutes a part of the bushing hole, is elongate and in connection with a drain hole 12 which is directed rearwards in relation to the drive direction of the chain. When running, the chain pin 4 will be in contact with the contact part 15. The contact surface 14 will be relatively large by straight running of the chain. In FIG. 4b the elongate hole is shaped so that its width increases with the distance from the front edge 18 of the hole 17. By ice formation in the interspace 19 between the chain pin 4 and the contact surface 14, the chain pin is pressed backwards as shown in FIG. 4c. However, there is still ample space behind the chain pin so that the chain link does not break due to the ice formation.

Figure 5A:
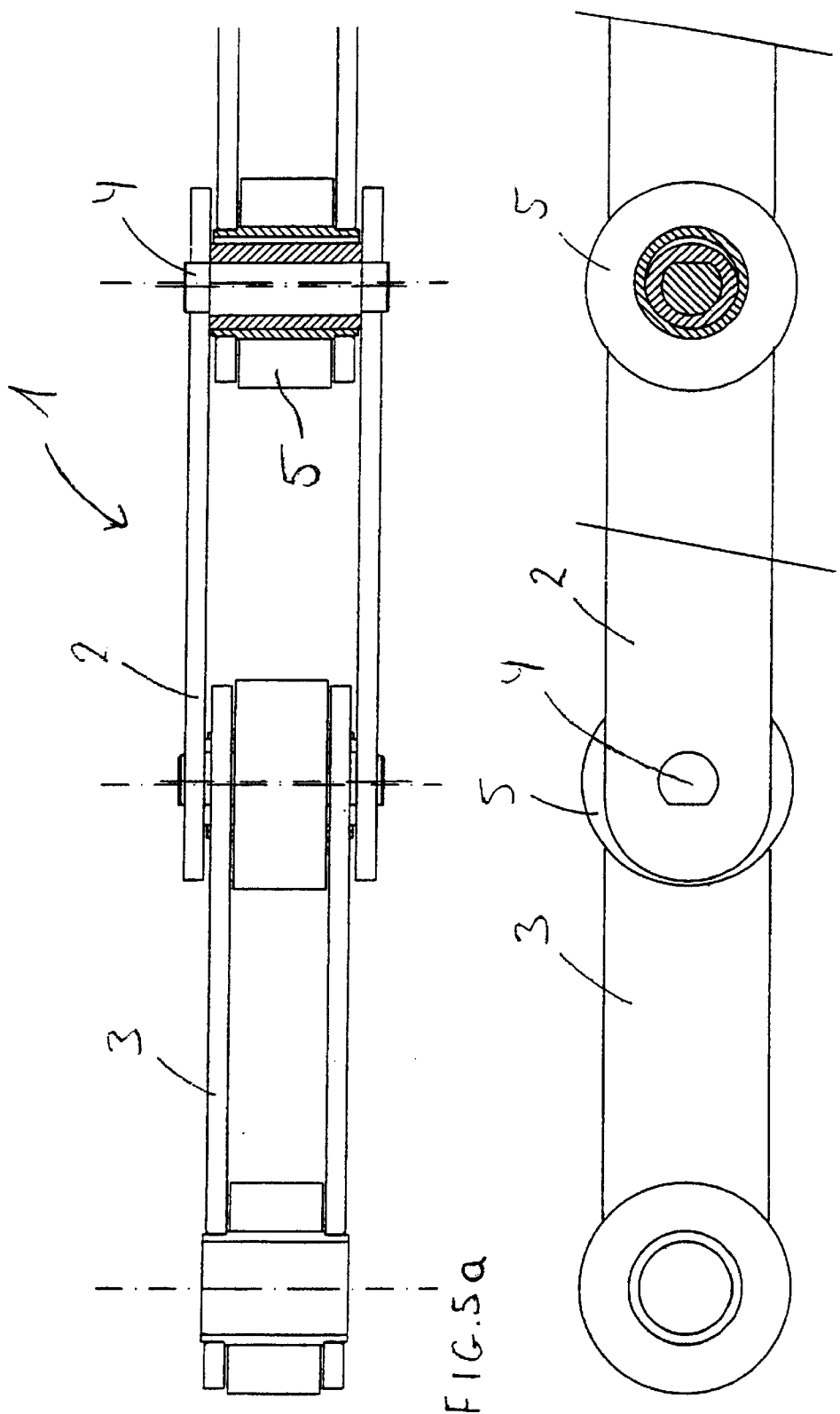
FIG. 5 shows an alternative embodiment of a chain link according to the invention.

FIG. 5 shows a chain link 1' in an alternative embodiment. The chain link shows a chain link according to the invention in the shape of a link 1 for a roller chain. The chain is shown in FIG. 5a as seen from the side and in cross-section, and in FIG. 5b as seen from below and in cross-section. It is noted that also the chain shown is intended for use in a chain conveyor, and so that the chain pins 4 are oriented vertically. The chain has a number of similarities with a traditional roller chain and comprises outer fishplates 2 and inner fishplates 3 where the two outer fishplates 2 are rotatably connected with the inner fishplates 3 via a chain pin 4' which is fastened to the outer fishplates 2. A roller 5 around the bushing reduces wear on the bushing during operation. The fishplates 2 and the rollers 5 in the chain link according to the invention may be made of different materials, such as polymer or metal.

Figure 6:
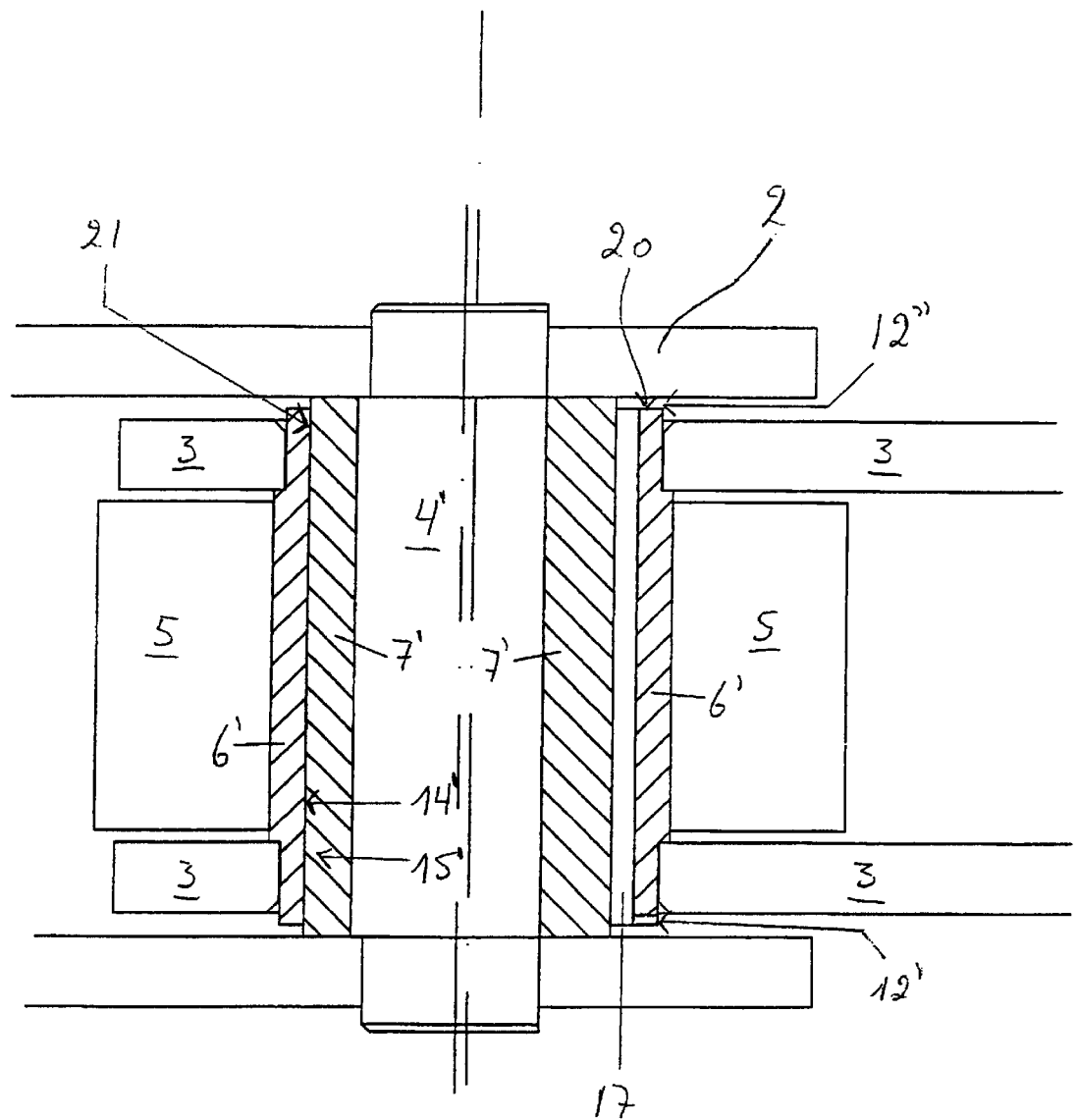
FIG. 6 shows the chain link in the alternative embodiment in enlarged version.

FIG. 6 shows a partial view of the chain link of FIG. 5 in an enlarged version. The chain link differs from known art by an insert 7' between the chain pin 4' and the bushing part 6' where the insert 7' is rotationally fixed to the chain pin 4'. Drain holes may be made in this embodiment as drain holes 12' in the bushing part 6' itself, which in principle is analogous to the embodiment as shown on FIG. 3, or as interspaces 12" between the end edge 20 of the bushing part 6' and the adjoining fishplate 2.

Figure 7A:
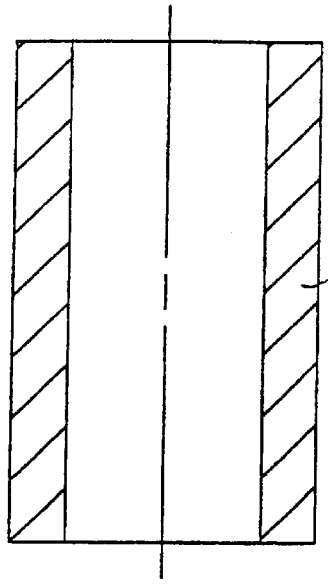
FIG. 7 shows single elements of the chain link in the alternative embodiment.
Figure 7B:
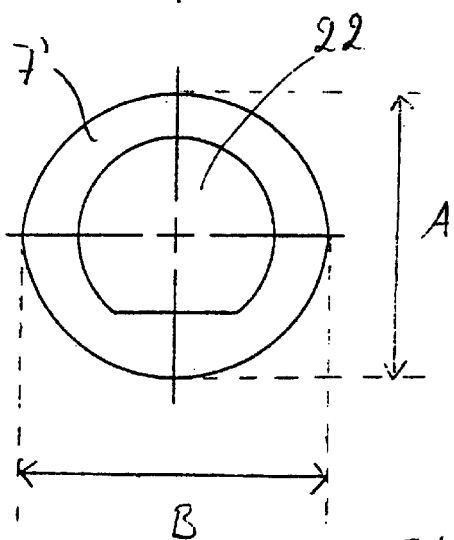

FIG. 7a shows the insert 7' in cross-section, and FIG. 7b shows the insert 7' as seen from the end. The hole 22 through the insert corresponds to the cross-section of the chain pin 4' and is designed so that a rotationally fixed connection between the chain pin 4' and the insert 7' is ensured.

Figure 7C:
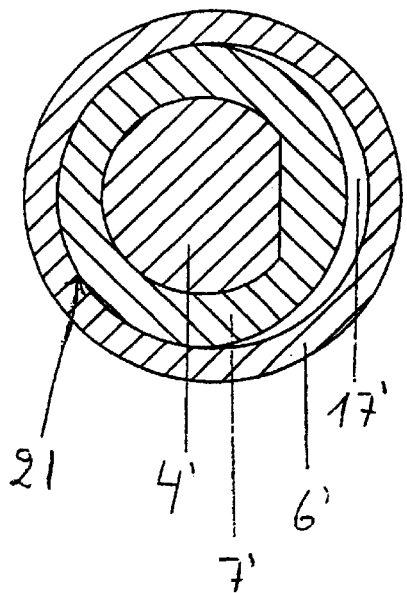

In FIG. 7c is shown a cross-section of the chain pin 4' and the enclosing insert 7' in the contact hole 17'. The contact hole 17' in the bushing part 6' is circular in this case. However, the cross-section of the insert 7' is not circular but has an elongate shape so that the cross-section of the insert (7') in longitudinal direction A is less than the cross-section of the insert in the transverse direction B.

The contact hole 17' does not necessarily have a circular cross-section but has, however, constant bending radius in the front part 21 of the contact hole where the insert 7' with the same bending radius of the front part of the insert 7' is in contact with the contact hole.

On FIG. 6, the insert 7' extends through the contact hole 17' from one fishplate 2 to the other fishplate 2. However, it is also possible that the insert 7' only partly extends through the contact hole 17. Hereby the contact part 15', which is the part of the insert being in contact with the contact surface 14', becomes shorter. In this case the above described shaping of the insert 7' only concerns the contact part 15' of the insert.

What is claimed is:

1. A chain link with a bushing in a drive chain, wherein the bushing comprises at least one drain hole for draining liquid inappropriately collected in the bushing, wherein the chain link comprises a chain pin extending through the bushing, and the bushing comprises a contact part with a contact hole, the chain pin being in contact with the contact part when advancing the drive chain, wherein a radius of a front part of the chain pin corresponds to a bending radius in the contact part of the contact hole, wherein the contact hole has a cross-section which is elongate so that the cross-section is greater in a longitudinal conveying direction of the chain than perpendicularly thereto.

2. A chain link according to claim 1, wherein height of the contact hole increases with the distance from the contact part of the contact hole.

3. A chain link according to claim 1, wherein the chain link, suitably forming a part of the drive chain in a shape of a bushing chain or roller chain, comprises two outer fishplates connected by means of chain pins, and two inner fish plates connected by means of two bushings, wherein each of the bushings comprises an inner duct and at least one bushing insert with the contact hole, the bushing insert being disposed at least partly in the inner duct.

4. A chain link according to claim 3, wherein the bushing insert further comprises a collar extending from the inner duct to and around the edge of the inner fishplate and extending in an interspace between the outer fishplate and the inner fishplate.

5. A chain link according to claim 3, wherein the bushing insert is formed with at least one drain hole in the interspace between the outer fishplate and the inner fishplate.

6. A chain link with a bushing in a drive chain, wherein the bushing comprises at least one drain hole for draining liquid inappropriately collected in the bushing, wherein the chain link bushing further comprises a tubular bushing part with a through-going contact hole through which a chain pin is extending, wherein the chain pin at least partly is enclosed by an insert with rotationally fixed connection between the insert and the chain pin, wherein the insert comprises a contact part, a front face of which having a constant bending radius corresponding to a bending radius of a front part of the contact hole, and wherein a cross-section of the contact part is shorter in a longitudinal conveying direction than in a transverse direction.

7. A chain link with a bushing in a drive chain, wherein the bushing comprises at least one drain hole for draining liquid inappropriately collected in the bushing, wherein the chain link bushing further comprises a tubular bushing part with a through-going contact hole through which a chain pin is extending, wherein the chain pin at least partly is enclosed by an insert with rotationally fixed connection between the insert and the chain pin, and wherein the insert comprises a contact part, a front face of which having a constant bending radius corresponding to a bending radius of a front part of the contact hole, with a cross-section of the contact part being elongate so that the cross-section is greater in a longitudinal conveying direction than perpendicularly thereto.

8. A chain link according to claim 6, wherein at least one drain hole is provided in said tubular bushing part or in an interspace between an edge of the bushing part and an adjoining fishplate.

9. A chain link according to claim 6, wherein the chain link, suitably forming a part of a bushing chain or roller chain, comprises two outer fishplates connected by means of chain pins, and two inner fish plates connected by means of two bushings.

10. A chain link according to claim 3, wherein the bushing insert is made of a polymer material.

* * * * *

UNITED STATES PATENT AND TRADEMARK OFFICE
CERTIFICATE OF CORRECTION

PATENT NO. : 6,691,862 B1
DATED : February 17, 2004
INVENTOR(S) : Mogens Rud

It is certified that error appears in the above-identified patent and that said Letters Patent is hereby corrected as shown below:

<u>Title page,</u>
Item [75], Inventor, should read -- Mogens Rud --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,691,862 B1
DATED : February 17, 2004
INVENTOR(S) : Mogens Rud

It is certified that error appears in the above-identified patent and that said Letters Patent is hereby corrected as shown below:

<u>Title page,</u>
Item [30], Foreign Application Priority Data, should read:
-- Nov. 26, 1999   (DK) ............................ 1999 01694 --.

Signed and Sealed this

Sixth Day of July, 2004

JON W. DUDAS
*Acting Director of the United States Patent and Trademark Office*